WILLIAM F. SCHREIBER,
GEORGE T. INOUYE,
INVENTORS

BY Lyon & Lyon
ATTORNEYS.

BANDWIDTH REDUCTION SYSTEM

Filed Oct. 1, 1956

3 Sheets-Sheet 2

WILLIAM F. SCHREIBER,
GEORGE T. INOUYE,
INVENTORS

BY Lyon & Lyon
ATTORNEYS.

BANDWIDTH REDUCTION SYSTEM

Filed Oct. 1, 1956 3 Sheets-Sheet 3

WILLIAM F. SCHREIBER,
GEORGE T. INOUYE,
INVENTORS

BY Lyon & Lyon
ATTORNEYS.

United States Patent Office 2,963,551

Patented Dec. 6, 1960

2,963,551

BANDWIDTH REDUCTION SYSTEM

William F. Schreiber, North Hollywood, and George T. Inouye, Los Angeles, Calif., assignors to Technicolor Corporation, Hollywood, Calif., a corporation of Maine Filed Oct. 1, 1956, Ser. No. 613,234

11 Claims. (Cl. 179—15.55)

This invention relates to signal bandwidth reduction systems, and, more particularly, to an improvement therein.

A great deal of effort has been made to find methods and apparatus for reducing the bandwidth of signals, such as video signals for example. The many advantages of reducing the bandwidth of signals, such as requiring less spectrum space in transmission and affording economical recording, are fairly obvious. With the vast increase in radio and television broadcasting and the limited space for transmitting frequencies, efforts at reducing bandwidth have been intensified. Also, great interest has been shown in reducing bandwidth of video signals, so that they may be recorded for subsequent rebroadcast.

An object of the present invention is to provide a novel and improved system for reducing the bandwidth of signals.

Another object of the present invention is to provide a bandwidth reduction system having great reliability.

Yet another object of the present invention is the provision of a bandwidth reduction system, the cost of which is reasonable.

Another object of the present invention is the provision of an improved system for reducing the bandwidth required for transmission of a video signal without losing the information of the video signal.

Yet another object of this invention is the provision of a system which enables an economical recording system for video signals.

These and other objects of the present invention are achieved by first converting a signal into a series of numbers representative of the signal characteristics and from which the signal may be reconstructed. A well-known arrangement for doing this is the arrangement for performing pulse-code modulation of a signal wherein the resultant output consists of a sequence of binary numbers. These binary numbers may consist of four (more or less) simultaneously coexistent binary electrical signals corresponding to the four binary digits in the number. Means are provided to sense whenever there is a change in these signal-representative numbers. Another means is provided which performs the function of timing the interval between changes in these signal-representative numbers and generating a second number representative of that interval. Both the signal-representative number and its associated second number are stored. Means are provided for reading out of storage in sequence the signal-representative number and its associated second number. These are then transmitted. The rate of transmission need not be the same as the rate of storage.

A receiver for these signals is provided with a storage means into which the received signal-representative numbers and associated second numbers are written. The receiver also has apparatus for converting the signal-representative number into the signal. In the illustration employed herein, this may be the translator which translates pulse-code modulation into the signals from which the PCM binary numbers were derived. Means are provided for generating intervals represented by the second numbers. The second numbers are read out of storage in sequence and the signal-representative numbers are applied to the translator for the intervals indicated by the associated second numbers. For signals such as video signals where substantially the same brightness levels are maintained over areas of the video picture, a considerable saving in bandwidth for either transmission or storage is achieved.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

The general scheme of bandwidth reduction by means of run-length coding has been described in a thesis entitled Predictive Coding by Peter Elias (Harvard, 1950). It is pointed out there that in a facsimile transmission of a black disc on a white background it is only required to transmit the brightness level of the white background plus another piece of information consisting of the interval over which that brightness level is maintained. Then, the brightness level of the black disc must be transmitted along with the interval of its existence and then again the brightness level of the white background, as well as the information as to its duration. Thus, instead of transmitting a signal continuously for each line of the picture, it is only necessary to transmit six pieces of information. Elias points out that for television (as opposed to facsimile) circuits for accomplishing the coding are not available. The present invention shows how the run-length coding principle may be extended, not only to television, but to any type of signal system having the video-signal characteristics, namely, during the transmission there are times when the signal maintains the same characteristics over substantial intervals. Furthermore, the present invention employs presently known structures to achieve the end of encoding and decoding signals having the characteristics noted above.

The present invention will be explained and described in terms of the encoding and decoding of television picture signals. This should not be construed as a limitation upon the invention, since it will be recognized by those well versed in these arts that the invention may be extended for use with other types of signals. Accordingly, for the purposes of electrical picture transmission, what is transmitted by this invention is information relative to the duration of sequences of picture elements of equal brightness. The reason that this system may thus economize on transmission bandwidth is that when a television camera scans across relatively blank areas of a picture, the information rate is very low, and when it scans across sharp, high-contrast edges in a picture, the information rate is very high. The present invention economizes on transmission bandwidth by spreading the information generated during scanning edges over a longer period of time and by concentrating the information generated in scanning blank areas into a shorter period of time. Information may then be transmitted at a constant rate approximately equal to the average rate of generation by the television signal source.

Figure 1:
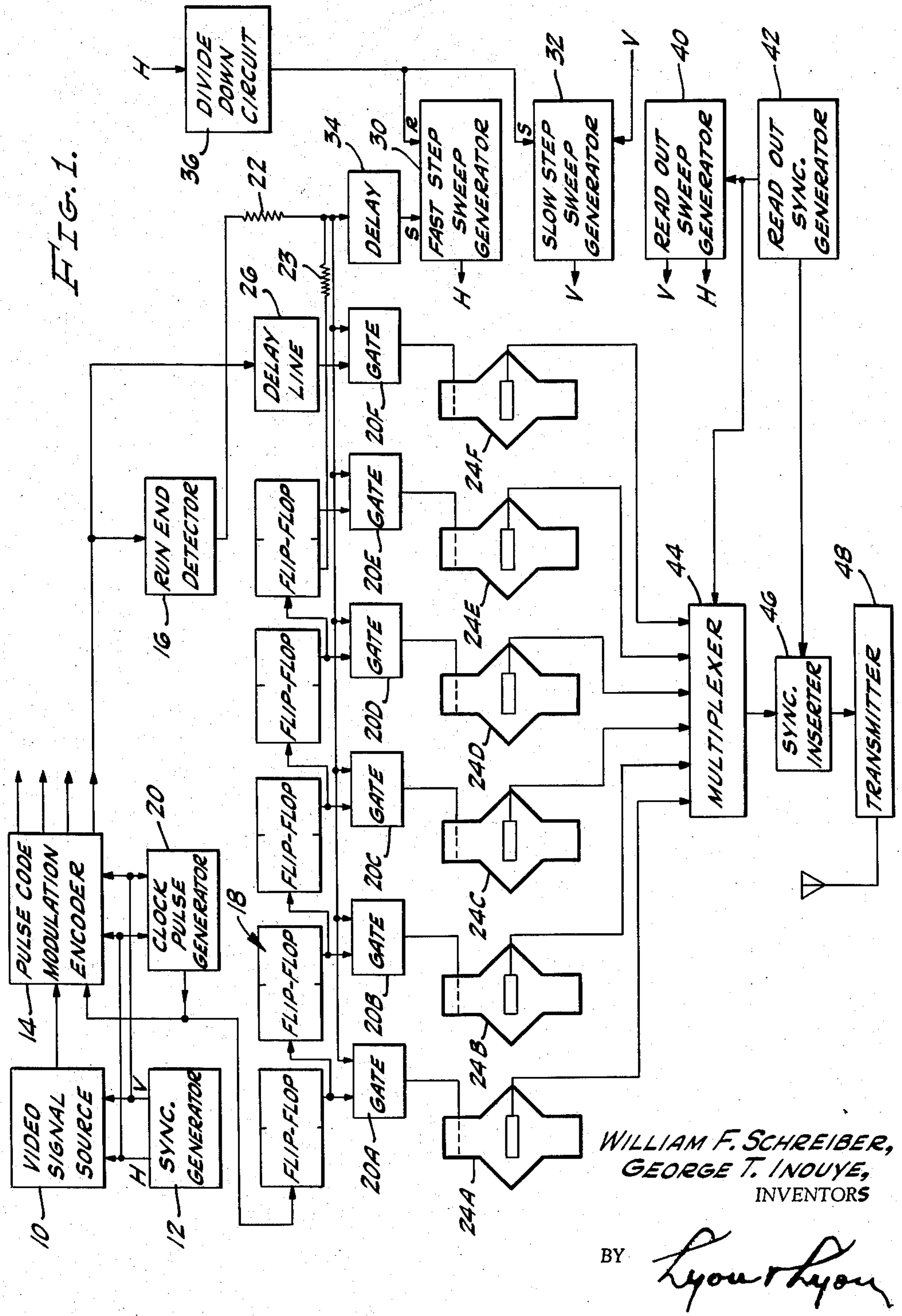
Figure 1 is a block diagram of a signal encoder in accordance with this invention.

Reference is now made to Figure 1 of the drawings, which shows in block schematic form an embodiment of the invention used for encoding television signals. There is shown a video signal source 10, which may be the television camera, or other source of video signals. A sync generator 12 provides horizontal and vertical synchronizing signals to the video-signal source. The sync generator is well known and is usually found in a television transmitter. Signals from the video signal source are sent to a pulse-code modulation encoder 14. This apparatus is well known and is described by W. M. Goodall in an article in the Bell System Technical Journal for January 1951 entitled Television by P.C.M.

The pulse-code modulation, or PCM, encoder produces a series of numbers in the form of a simultaneous digital output which represents the brightness levels of the video signals. The remainder of the apparatus in Figure 1 is what is necessary to encode one of the digits provided by the pulse-code modulation encoder. If it is desired to encode all of the digits, then the apparatus shown in the remainder of Figure 1 is repeated for each digit. In order to further economize on transmission bandwidths, the less-significant digits may be omitted or may be transmitted at a lower frame rate. However, this explanation will be directed to the encoding of one of the digital outputs which is a binary (two-valued) video signal. If binary video signals are already available, then they may be inserted into the encoder at this portion of the circuit diagram.

The binary video signal is fed to a run-end detector 16. This apparatus has the function of producing pulses indicative of the fact that the binary digit signal changes from one binary representation to the other. This may be achieved by employing a flip-flop circuit which is triggered from one condition of stability to another condition of stability whenever its input changes. Alternative to this, there can be employed a cathode-ray tube in which the cathode-ray beam is deflected along one path by one binary signal and returned along this path by the other binary signal. At any suitable point along its deflection path an output may be detected, either photoelectrically or by positioning a target which indicates the fact that the cathode-ray beam is passing across it. Thus, the output of the run-end detector is a signal indicative of the fact that a change has occurred in the binary digit output of the pulse-code modulation encoder.

Both the pulse-code modulation encoder 14 and a counter 18 are driven by the output of a clock-pulse generator 20. Horizontal and vertical synchronizing signals are fed from the sync generator 12 to both the pulse-code modulation encoder and the clock-pulse generator. In the clock-pulse generator at the beginning of each active horizontal scanning line these sync signals initiate a train of high-frequency pulses. For a coding of a video signal of four-megacycle bandwidth, usually these clock-pulse generator output signals are at an eight-megacycle rate.

The counter 18, represented in Figure 1, may be the usual and well-known type of binary counter which consists of a series of flip-flop circuits in which the pulses applied to the counter are applied to the first flip-flop in the series and it drives the succeeding flip-flops in well-known binary fashion. A suitable binary counter is described and shown in an article in the RCA Review by Igor Grosdoff, entitled Electronic Counters, in the September 1946 issue. The count condition of the counter is manifested by the pattern of its output voltages. The output of the flip-flops in a counter, which as shown in the block diagram, consists of an output connection from each one of the flip-flops comprising the counter, is applied to an associated gate 20A through 20E. A second required input to each one of the gates is provided from the run-end detector 16 through a summing resistor 22.

The gate circuits are well-known coincidence types of circuits which require the simultaneous presence of both of their inputs before they supply any output indicative of one of the inputs. Suitable gate circuits are described and shown in an article entitled Diode Coincidence and Mixing Circuits in Digital Computers, by Chem, T. C., in the I.R.E. Proceedings, vol. 38, pp. 511–514, May 1950. The output of the gate circuits, 20A through 20E, in the presence of the enabling signal from the run-end detector, will be the output applied from the flip-flop, which depends upon whether the flip-flop is in its one or zero condition at the time the enabling pulse is applied to the gate. As many counter stages as are desired may be employed. By way of example and because the number has been found adequate, five counter stages are shown. These provide a total count of 32 before the counter is filled and starts counting pulses anew.

Since information is being received from the video signal source at one rate and will be transmitted at a second rate, it is necessary to include in the invention an information reservoir, into which information may be put in short, high-intensity bursts, and out of which information may be taken at a relatively constant rate. One storage system which can be employed in the embodiment of the invention is the graphechon storage tube, provided electrostatic deflection is used. This is an electrostatic storage tube which has two guns, one for reading and one for writing, both of which functions may be carried out simultaneously and independently. It should be noted, however, that the system may be designed around any type of random-access storage device of adequate resolution, storage capability, access time, and reliability. It is also not necessary that simultaneous reading and writing may occur. Thus, another suitable storage arrangement would be magnetic-core storage. The graphechon is described in an article entitled The Graphechon—a Picture Storage Tube, by L. Pensak, in the RCA Review for March 1949.

The counter 18 enters its count condition into five of these electrostatic storage tubes 24A through 24E. The entry of these outputs from the counter occurs at each time the binary digit being encoded changes from one binary manifestation to the other. Also, a sixth storage tube 24F is provided for the purpose of storing the binary number representing the signal. This may be seen by the connection from the output of the pulse-code modulation encoder through a delay line 26 and through a gate 20F, which is similar to the other gates 20A through 20E. Thus, at the time the run-end detector opens the gates 20A through 20E, it also opens the gate 20F. The delay line 26 holds the binary digit which was present at the output of the pulse-code modulation encoder prior to the digit which is causing the runend detector to function, long enough so that it is present at the gate 20F when it is opened. The output of gate 20F is inserted into the storage tube 24F at the same time as the output of the counter 18 is inserted into the storage tubes 24A through 24E.

Deflection of the cathode-ray beams in the graphechon storage tubes 24A through 24F which are employed is made simultaneously by a fast-step-sweep generator 30 and a slow-step-sweep generator 32. The fast-step-sweep generator controls the horizontal deflection and the slow-step-sweep generator controls the vertical deflection of the beams. The deflection plates of all the tubes are connected in parallel, so that all the beams are at corresponding points of their storage surfaces at the same time.

At the beginning of the frame (of the television signal), the step-sweep generators are reset so that the writing beam is at the upper left-hand corner of the target plate, but the beam is cut off. When the first run-end is detected, the gates enable the turning on of the beams for a brief instant, thus storing in each tube either a one or a zero collectively, indicative of the count in the counter at that time, and a one or a zero, indicative of the brightness signal at that time. After a short delay for permitting storage, which is provided by the delay network 34, the fast-step-sweep generator is enabled by the signal received to move all the beams to the adjacent storage space which can be considered here as one step to the right or to the next storage element.

The run-end detection pulse, which is received through the delay line 34, is applied to the input terminal of the fast-step-sweep generator which is labeled as "S," representing the set input terminal. The "R" input terminal represents the reset input terminal. A signal applied to this terminal causes the fast-step-sweep generator to perform the operation of moving the cathode-ray beam all the way back to the left. This occurs when an input pulse is received from the divide-down circuit 36. This divide-down circuit is merely a frequency counter chain of the same type as the counter 18, which has applied to its input the horizontal sync pulses and provides a single output pulse at the end of five lines.

When the next run-end is detected, the gates are again opened and storage again takes place. Thereafter, the step-sweep generator steps the cathode-ray beam one step to the right to the next storage space.

In order to provide for runs which are longer than the capacity of the counter, the counter itself produces a pulse which is identical to the run-end pulse in effect whenever it fills or completes its cycle. This may be seen by the connection from the last flip-flop counter stage via the resistor 23 to the delay line 24. Thus, when the counter fills, an entry of the count is made into the storage tubes through the gates and also the brightness level number at that time. The counter then starts counting again and the run-end detector functions as previously described to open the gates to enable the storage of the next second number representative of the interval which has elapsed from the time that the counter was filled. Since the first number representative of the video brightness is always simultaneously stored in the sixth storage tube, ambiguity in reproduction is avoided, since it is immaterial whether the outputs from the storage tubes represent the situation at the time of a full counter condition or at the time of an actual run-end.

Approximately 10,000 runs are expected to occur in a binary video picture of substantial complexity and these can be stored in a matrix of 100 x 100 storage positions in the storage tubes. For accomplishing this, the fast-step-sweep generator 30 is reset as previously described by output from the divide-down circuit 36. Since there are 525 lines in a television picture, one line of the storage tube is used to contain the information relative to five lines of the picture; thus only about 100 lines for information storage are required. Thus, the divide-down circuit divides the horizontal sync frequency to provide one output pulse for every five input pulses. For a video picture of substantial complexity, there are 20 runs per television line. Then about 100 storage positions per line in the storage tube should suffice for five lines of the television picture.

At the time that the divide-down circuit 36 supplies an output pulse to reset the fast-step-sweep generator, the same output pulse is applied to the slow-step-sweep generator 32 to cause it to provide the necessary signal to move the cathode-ray beams in the storage tube down to the next line. At the end of the frame, the vertical sync pulse is employed to cause the slow-step-sweep generator to move or reset the cathode-ray beams in the storage tubes back to the initial storage position in all the tubes. Deflection circuits of the type designated as fast-step-sweep generator and slow-step-sweep generator are well known in the art. The ones employed with the embodiment of the invention which was constructed are of the condenser pulse-storage type and are described and shown in detail on pages 617 et seq. of the book Waveforms, by Chance et al., published by the McGraw-Hill Book Company.

There has been described thus far the means by which the information corresponding to the run-end positions of all the runs in a picture are stored in the storage tubes. The remainder of the apparatus shown in Figure 1 may be employed for reading the information out of the storage tubes in sequence and at a constant rate for either transmission or more permanent storage. The reading ends of the storage tubes also have all their deflection plates operated in parallel. A read-out sweep generator 40 causes all the six cathode-ray beams to scan the stored patterns at a rate sufficient to read out a frame of information in one frame interval. A simpler scheme for read-out is to have constant frequency horizontal and vertical sweeps. To this end, a read-out sync generator 42 provides the necessary sync pulses for driving the read-out sweep generator. It is also possible to economize on transmission time to some extent by sweeping along each horizontal line in the storage tube only until all the information on that line has been read out. This length will be different in each case on account of the varying distribution of information in the original picture. Based upon the calculation that there are at most 10,000 runs in a television picture, then the output pulse rate from each storage tube will be about 300 kilocycles and the bandwidth required will be about 150 kc.

The signals from the six storage tubes are mixed in a multiplexer, which may be for example, an electronic six-pole selector switch operated at a frequency of 300,000 complete selections per second. The output of the multiplexer is a composite signal which may be considered either as representing the run-end positions and video brightness, or intervals over which video brightness levels exist. Sync signals are added by means of the sync inserter 46 and the resultant signal is fed to the transmitter 48 for transmission over the air. For synchronization signals here the vertical sync frequency may be 60 cycles per second and the horizontal sync frequency may be 3150 cycles per second ($\frac{1}{5} \times 15{,}750$).

The multiplexer 44, which has been described above, is a well-known type of electronic circuitry which selects in sequence the signals from the storage tubes at a rate established by signals from the read-out sync generator.

Figure 2:
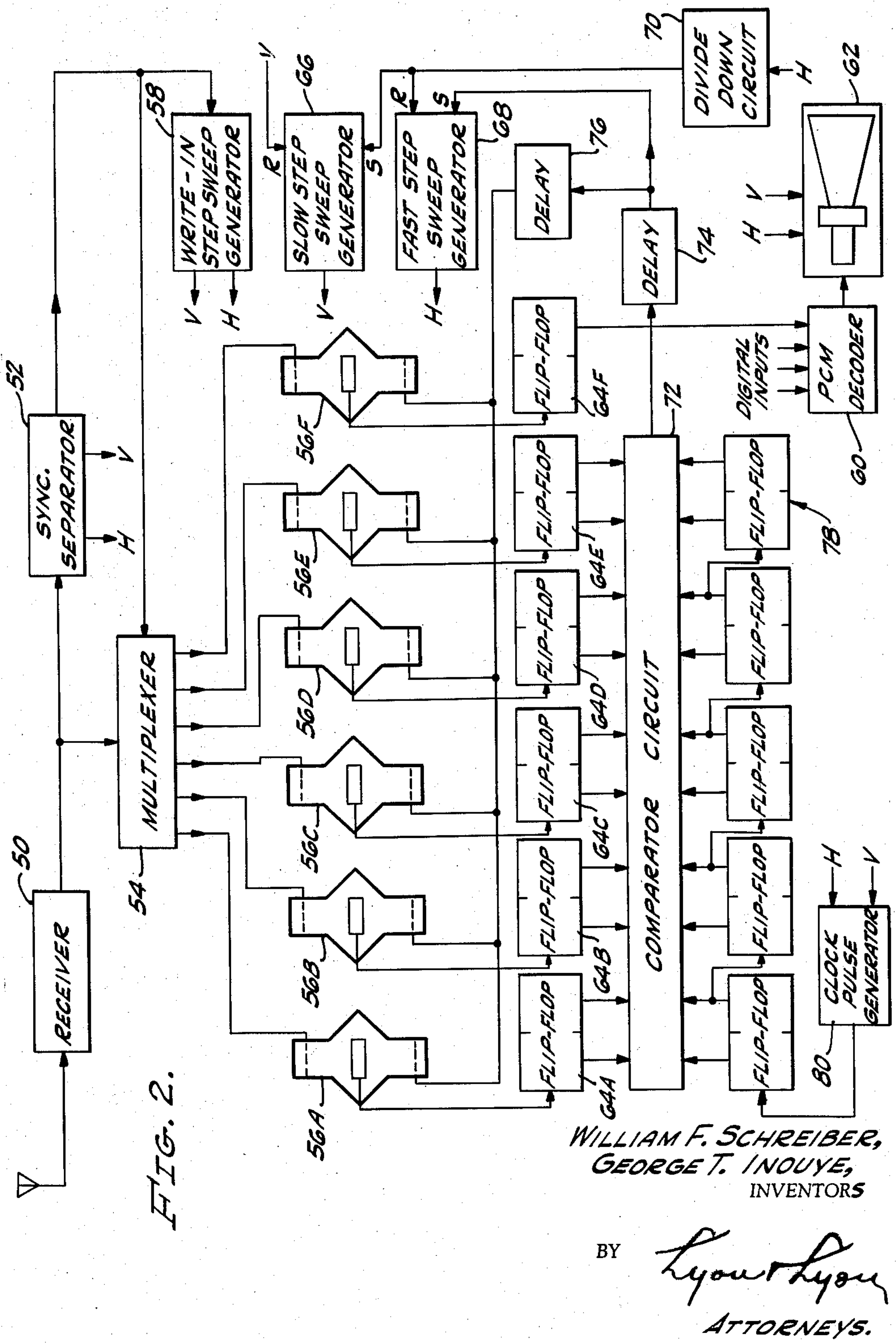
Figure 2 is a block diagram of a signal decoder in accordance with this invention.

Figure 2 is a block schematic diagram of a receiver for converting the signals transmitted by the transmitter shown in Figure 1 into a television picture which may be viewed upon a cathode-ray tube screen. The block labeled "receiver" 50 is the usual front-end apparatus for receiving signals from a television station. These signals are the composite signals consisting of the first and associated second numbers, respectively representing the video amplitude level and the intervals over which they occur with the sync signals inserted at the proper places for operating the sync-separating portions of the receiver. The sync separator 52 has applied thereto the signals from the receiver and provides as its output the horizontal and vertical synchronizing signals. These can be used for synchronizing the horizontal and vertical sync oscillators from which vertical and horizontal deflection signals may be derived. Also, a multiplexer 54 is employed to take the sequence of signals and present them in parallel form to six storage tubes. The multiplexer is also driven synchronously by the output of the sync separator. The six storage tubes 56A through 56E may be graphechon tubes of the same type as were employed in the transmitter. The information supplied through the multiplexer is written into the storage tubes in parallel and a write-in step-sweep generator 58, which also is driven by output from the sync separator, serves the purpose of deflecting the cathode-ray beams in successive lines across the storage target of the graphechon tubes, whereby the first numbers and associated second numbers are stored. The purpose and effect of these circuits and arrangements is to write into the storage tubes at the receiver a charge pattern just like that in the storage tubes at the transmitter.

In the receiver, pulse-code modulation decoder equipment 60 is employed. This equipment will provide as an output a signal whose amplitude is determined by the binary digital number applied to its input. This digital number is made up of the digit derived from each storage tube 56E, a separate one of which is employed for storing each of the digits from the PCM encoder received over the air. It will be recalled that when the transmitter was described a separate encoder was stated as being required for each one of the digits which it is desired to encode, which is the output of the pulse-code modulation encoder. Similarly, in the receiver for decoding the run-length signals, a separate decoder is required for each one of the digits which has been encoded, but only one pulse-code modulation decoder is necessary for all the digits. In the receiver shown in Figure 2, only a single decoder is shown. It will be appreciated that if four digits are encoded, then four of the decoders comprising the multiplexer 54 and the subsequent read-out and interval-measuring apparatus is required.

The arrows designated as digital inputs to the PCM decoder 60 are the outputs from the other decoders, not shown. These digital inputs are applied to the PCM decoder for an interval determined by the second numbers which were stored with the first numbers. These first numbers, it will be recalled, are actually the binary digits of the pulse-code modulation encoder. Each time the digital input changes, the PCM decoder provides a corresponding brightness-level output signal to the subsequent cathode-ray tube apparatus 62. Changes in the digital inputs occur in accordance with the information which the second numbers convey. Thus, the cathode-ray tube is enabled to display an intelligible video picture corresponding to the one which was first viewed by the video camera. For the purpose of establishing the interval over which a first number is maintained, there is provided a series of flip-flops 64A through 64E, into which is entered from the storage tube the second numbers.

Read-out from the storage tube is accomplished by means of a slow-step-sweep generator 66 and a fast-step-sweep generator 68, respectively corresponding to the slow-step-sweep generator 32 in the transmitter and the fast-step-sweep generator in the transmitter. The divide-down circuit 70 divides down the horizontal sync pulses so that one pulse is provided as output for every five input pulses. The deflection apparatuses on the reading side of the storage tubes are also driven in parallel. The fast-step-sweep generator advances these cathode-ray beams across one line at a time. It receives the pulses which enable it to advance the cathode-ray beams to successive storage sectors along the line from a comparator circuit 72 and which applies its output to a delay circuit 74.

It should be noted that the output of the delay circuit 74 is applied to a second delay circuit 76. The output of this second delay circuit is applied to the cathode-ray beam control grid of all of the graphechon tubes and turns them on at the time that the comparator circuit indicates comparison between the digital information consisting of the second number which is in the flip-flop 64A through 64E and the output of a counter 78, which is driven by pulses from a clock-pulse generator 80. The clock-pulse generator is synchronized by the horizontal and vertical sync pulse inputs.

To recapitulate the operation of the receiver, the incoming coded signal which consists of first and second number representative electrical signals and sync signals are applied to a multiplexer 54 and the sync separator 52. The multiplexer performs the function of converting the serial form of the numbers into a parallel form and applies these to the six graphechon tubes to be stored so that the first and second numbers are properly associated. A sync separator separates the horizontal and vertical synchronizing signals and supplies them to the remainder of the system for the purpose of assuring that operation thereof is properly timed. Five of the graphechon tubes thus contain information as to the interval or duration of existence of the brightness signal in the sixth tube. This digital information is simultaneously read out of the six tubes into six registers 64A through 64F. These individual binary registers may be fast flip-flop circuits which, once triggered by a one or a zero from the storage tubes, hold that condition until a new signal is received.

Clock pulses are generated by a clock-pulse generator which is synchronized by horizontal sync pulses. This clock-pulse generator advances the count of the counter until the voltage pattern which represents the output of the counter is the same as the voltage pattern which represents the output of the five flip-flop stages associated with the second number. During the time of this count, a sixth flip-flop stage 64F applies the digital signal representing the brightness level to the PCM decoder 60. When a comparator circuit 72 indicates an identity, the output of the comparator circuit is applied to a delay circuit 74 which advances the cathode-ray beams (now turned off) to the next storage position, and a second delay circuit 76, the interval of which is to permit the cathode-ray beam advance to occur, applies its output to the control grids in the reading side of the storage tubes to turn them on for an instant. At this time, the output of the six storage tubes is entered into the six register stages 64A through 64F to replace the information previously there. The brightness-level signal provided by the output of the PCM decoder is then altered to represent the new value of the digital input.

A suitable system comprising the registers 64A through 64E, the counter 70A, and the comparison circuit 72 is shown and described in a patent to Hoeppner, No. 2,607,006. A suitable system for multiplexing signals from serial to parallel, or vice versa, is described in a patent to J. P. Smith, No. 2,403,561.

Although there is shown and described a straightforward operating binary counter in both the transmitter and the receiver, in the preferred embodiment of the invention there is employed a reflected binary counter. The reflected binary code, which is provided as output from the counter in response to a succession of input pulses, is a code which has the advantage that the codes for two successive numbers differ in only one digit. Consequently, if a counter, which is counting pulses which occur at a regular rate, is interrogated by some external circuit at any random time, at the most only one stage of the count will be in process of transit from one state to another and, whether the output from this stage is read as a one or a zero, an error of at most one in the number represented will result. In the regular counter, on the other hand, all stages may be in transit at some time, and, of the outputs of some of these stages are read as ones and the outputs of others as zeros, then a serious error may result. In the present embodiment of the invention, interrogation of the counter is performed both at the transmitter and at the receiver. Therefore, the counter which counts in reflected binary code is a more desirable arrangement. The reflected binary code is described, for example, in a patent to Carbrey, No. 2,571,-680, wherein is shown an arrangement for converting from reflected binary code to conventional binary code.

Figure 3:
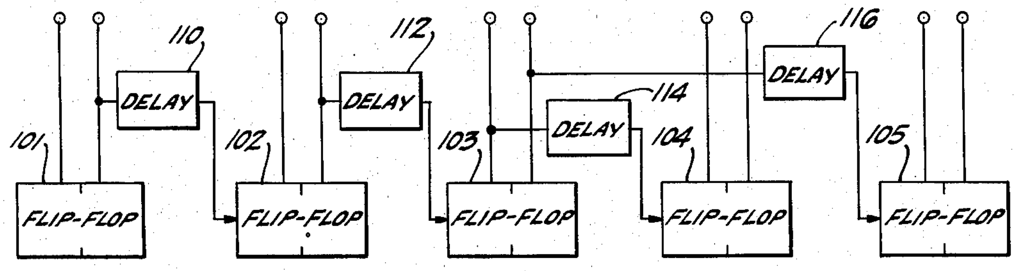
Figure 3 is a block diagram of a preferred type of counter to be employed with the embodiment of the invention.

Figure 3 is a block schematic diagram of a reflected binary code counter suitable for utilization in the embodiment of the invention. In order to facilitate an understanding of the operation of this counter, the table below shows a decimal count from zero to 15 adjacent to the equivalent in the reflected binary code and its equivalent in the regular binary code:

| | Reflected | Regular |
|---|---|---|
| 0 | 0 0 0 0 | 0 0 0 0 |
| 1 | 1 0 0 0 | 1 0 0 0 |
| 2 | 1 1 0 0 | 0 1 0 0 |
| 3 | 0 1 0 0 | 1 1 0 0 |
| 4 | 0 1 1 0 | 0 0 1 0 |
| 5 | 1 1 1 0 | 1 0 1 0 |
| 6 | 1 0 1 0 | 0 1 1 0 |
| 7 | 0 0 1 0 | 1 1 1 0 |
| 8 | 0 0 1 1 | 0 0 0 1 |
| 9 | 1 0 1 1 | 1 0 0 1 |
| 10 | 1 1 1 1 | 0 1 0 1 |
| 11 | 0 1 1 1 | 1 1 0 1 |
| 12 | 0 1 0 1 | 0 0 1 1 |
| 13 | 1 1 0 1 | 1 0 1 1 |
| 14 | 1 0 0 1 | 0 1 1 1 |
| 15 | 0 0 0 1 | 1 1 1 1 |

In Figure 3 there is shown a five-stage reflected binary code counter, which has a capacity to count up to 32. The arrangement shown is driven by pulses, the repetition frequency of which is half that of the counting rate. Thus, if the reflected binary code counter is employed in Figures 1 and 2, the clock-pulse generator in Figure 1 would provide eight megacycle pulses to the pulse-code modulation encoder and by means of an additional flip-flop inserted between the clock-pulse generator and the input to the counter, the pulse rate at the input to the counter would be at a four megacycle per second rate. Similarly, in the receiver of Figure 2, the frequency of the pulses to be applied to a reflected binary code counter in place of the one shown would be at a four megacycle rate. The reflected binary code counter in Figure 3 has five flip-flop stages. Any flip-flops capable of operating at the desired speed is satisfactory. Such a one is described in the Review of Scientific Instruments for December 1949, on page 942, in an article by Val Fitch.

The first flip-flop stage 101 drives the second flip-flop stage 102 through a delay circuit 110. The delay circuit provides a delay equal to the interval between the pulses at the frequency at which it is desired that the counter count. In other words, since the input to the reflected binary code counter is at half a desired counting frequency, the interval of delay provided by the delay line 110 is the interval between pulses at the desired counting frequency. This is termed a baud and for the frequencies concerned, namely, eight megacycles, is equal to .125 microsecond. The second flip-flop 102 drives a third flip-flop 103 through a delay line 112. The delay of this line is equal to two bauds, or 0.250 microsecond. One output of the third flip-flop 103 is coupled to drive a fourth flip-flop 104 through a delay line 114. The other output of the second flip-flop is coupled to drive the fifth flip-flop 105 through a delay line 116. Delay lines 114 and 116 provide equal delays which are four times that of delay line 110. Thus, delay lines 112 and 114 provide delays of four bauds.

A first input pulse to the flip-flop stage 101 will turn the first flip-flop stage over to its one condition, while the three remaining flip-flop stages are in their zero state. This corresponds to the one in reflected code. After .125 microsecond, the second flip-flop stage is turned over to its one condition. Thus, the voltage pattern from the counter will represent 1100, which is two in the reflected binary code. Note that the counter has counted two counts at an eight megacycle rate, even though the input was at a four megacycle rate. The next input pulse to the counter stage 101 drives this stage to the zero condition, at which time the voltage pattern which represents the count condition of the counter is at 01000. However, when flip-flop 102 was driven previously, it initiated a pulse through delay line 112. Because of the two-baud delay time, flip-flop 103 turns over after the second input pulse has been applied to the counter. The voltage output pattern of the counter is now 01100, or four in reflected binary code. The third input pulse to the counter drives the first stage to its one condition, whereby the counter represents a count condition 11100, equal to five in reflected binary code. Thereafter, the second stage 102 is turned back to its zero state by reason of the pulse applied thereto from the delay line 110, and the output of the counter represents 10100, or six in reflected binary code.

From the above it will be seen how the counter can continue to operate providing an output at an eight megacycle rate, even though it is being driven at a four megacycle rate.

In Figure 1, the output of the storage tubes has been depicted as being applied to a multiplexer, in order to be serialized and to permit the insertion of synchronizing signals. If, instead of applying the output from the six storage tubes to the multiplexer, these outputs are applied to other storage media which has the property of storing binary information without requiring the presence of power, an arrangement is provided for recording video signals wherein only the information essential for the recreation of the video signal is stored, which is much less than is required to be stored in conventional systems. This, of course, is desirable, since it permits utilization of presently existing storage facilities, such as drum or tape or magnetic cores, and admits of their operation, using presently known techniques.

Figure 4:
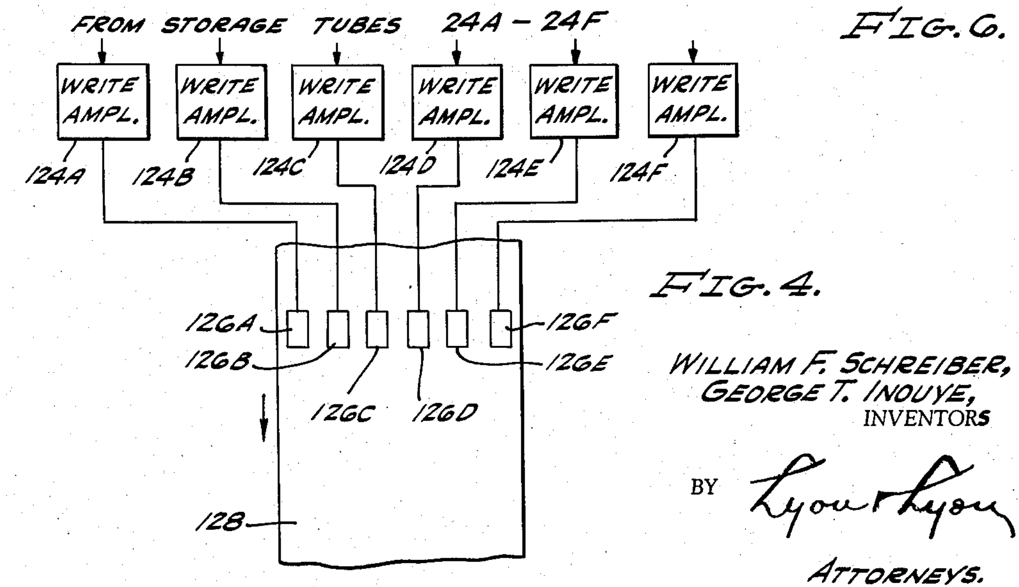
Figure 4 shows an arrangement for recording signals derived from the encoder on magnetic tape.

Thus, referring to Figure 4, there is shown a section of tape which is being moved at a desired rate of speed in accordance with the packing of information desired on the tape. The motion of the tape may be continuous, since, as previously pointed out, the rate on the read-out of the information which is in the graphechon tubes need not necessarily be the same rate as that at which the information is being stored. The reading outputs of the six graphechon tubes 24A through 24F is applied to six writing amplifiers 124A through 124F, each of which is connected to drive a separate magnetic transducer head 126A through 126F, which is over a separate track on the tape 128. Synchronizing signals may be stored on separate tracks on the tape, if desired. In order to reproduce the information which is on the tape, all that is required is the connection of the outputs from the tape to six graphechon tubes, such as those shown in Figure 2, with the signals to the tubes from the tape being provided in place of the signals from the multiplexer 54.

It should be understood that the arrangement in Figure 4 for recording the coded information by means of magnetic recording is equally applicable to any medium of recording capable of operating at the required speed, i.e., about 300,000 pulses per second per track for standard television pictures. This speed is attainable, for example, by photorecording, by xerography, or by electrographic recording. For photorecording, the magnetic tape of Figure 4 is replaced by photographic film, and the write amplifiers by light modulators such as cathode-ray tubes without deflection. Xerographic recording can be performed in the same manner as photorecording, except that a photoconductive medium would be used instead of photo film, and the image would be developed by spraying with a visible powder. In electrographic recording, the write amplifiers apply high voltage pulses to styli whose points are close to the recording medium, which could be paper tape. A discharge at the styli tips deposits small spots of charge on the paper, the spots being made visible by dusting with powder, as in xerography. An explanation of electrographic recording is found in a paper by H. Epstein, entitled "Burroughs Electrographic Printing Technique," which appears in the Proceedings of the Western Joint Computer Conference, Los Angeles, California, March 1955.

The playback of information recorded in visible form by any one of the above methods may be accomplished by one and the same technique. In the playback operation, the film or paper is run past an optical system which illuminates each of the tracks with a spot of light small enough to cover only one recorded spot at a time. Photoelectric pickups, such as phototubes or phototransistors, are arranged so as to receive light reflected from only one track and the electrical signals derived may be inserted into the decoder of Figure 2 in place of the multiplexer output.

An illustration of a recording arrangement which is to be considered as a part of this invention is an arrangement for photographic recording, preferably on high-definition film, such as Eastman Type 548, made and sold commercially by the Eastman Kodak Company. In this style of recording, shown in Figure 5, the permanent storage medium is the film 140, which takes the place of the storage tubes at the encoder and decoder. It serves the function of temporary storage for the smoothing of information rate, as well as permanent storage, thereby achieving a substantial reduction in cost and complexity of the equipment. In this system, six cathode-ray tubes 134A–134F are used in place of the six storage tubes shown in Figure 1. The same electrical signals are applied to the cathode-ray tubes as were applied to the storage tubes, except that no vertical deflection is used and therefore the slow-step-sweep generator is omitted. With this arrangement, there appears on the face of each cathode-ray tube a line of dots and spaces just like that in a single line of the storage tubes. The six cathode-ray tubes are arranged side by side, as in Figure 5, and imaged on a moving strip of film through a lens 136 in a camera 138. The lines of dots are arranged crosswise to the motion of the film. The phosphors of the cathode-ray tubes must have a persistence short enough so as not to blur the image of the spots on the film.

Figures 5, 6:
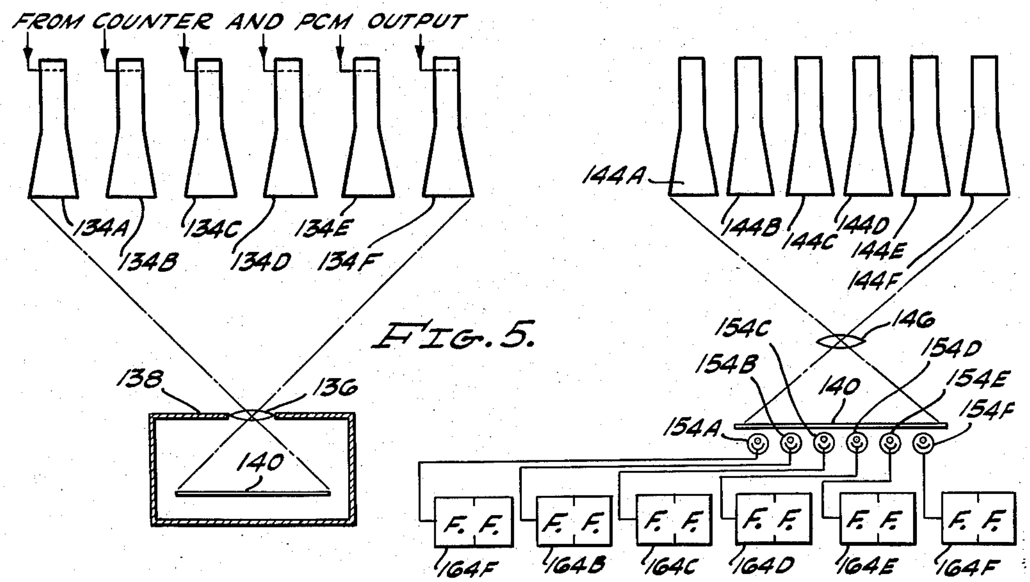
Figure 5 shows a preferred arrangement for recording signals derived from the encoder on film.
Figure 6 shows a preferred arrangement for reproducing signals recorded on film in accordance with the arrangement shown in Figure 5.

For playback, as shown in Figure 6, an arrangement much like the one shown in Figure 2 is used, except that six cathode-ray tubes 144A–144F are now used instead of the six storage tubes. The persistence of the phosphor used in the tubes must be extremely short, preferably phosphor of the P16 type. The tubes are arranged side by side, and the light emitted is imaged on the developed film 140, by the lens 146.

Six photocells 154A through 154F are arranged behind the film so as to receive the light transmitted, respectively, through the six zones of the film and to provide six output signals. The information recorded on this film was photographed from the corresponding faces of the six cathode-ray tubes at the encoder. The photocell output signals are inserted into the decoder at the inputs of the six register flip-flops 164A through 164F, which in the previous embodiment of the invention received the outputs of the six storage tubes. The operation of the decoder is then exactly the same as shown in Figure 2, except that the information is extracted from the film instead of from the storage tubes. Using the film recording system described, it is possible to record the information contained in a frame television picture on roughly 500 film lines which would require a film speed of 3" per second on 8 mm. film. This arrangement would require a millimeter for each zone of recording, wherein approximately 200 dots would be recorded.

With a continuous film development process the film recording and reproducing systems shown in Figures 5 and 6 can readily replace the graphechon storage arrangement in Figure 1. The signals read out from the continuously developed film may be transmitted in the manner shown. The film thus acts as both long and short term storage.

Accordingly, there has been shown and described herein a novel, useful, and reliable arrangement which, using presently known techniques, can encode video signal characteristics that is, signals having periods of nonvariance in their characteristics. The encoded signals have much less redundant information than that in the original signals and yet afford correct reconstruction of the original signals. The input to the encoder is a standard video signal, and the output therefrom is a reconstructed standard video signal. No start and stop scanning is required of the picture itself, but only of the digital display in the storage tubes. A further savings in bandwidth may be achieved in the manner stated previously, by transmitting the lower order of significance digits of the pulse-code modulator output in the transmitter at a frequency rate which is less than that used for the more significant digits. This can be achieved by not writing into the graphechons at the higher rate.

We claim:

1. A system for reducing the amount of information required for reconstructing signals having video-signal characteristics comprising pulse-code modulation encoding means to which said signals having video-signal characteristics are applied for sequentially generating first digital number-representative signals each of which represents a different portion of said signals having video characteristics, counter means for sequentially generating second digital number-representative signals indicative of the count of said counter, means for advancing the count of said counter means at the same rate as said pulse-code modulation encoder sequentially generates said first digital numbered-representative signals, means to determine when there is a change in value between said sequentially generated first digital number-representative signals, and means for recording both the first digital number-representative signal immediately prior to said change and the second digital number-representative signal occurring at the time of a change in the value of said first digital number-representative signals.

2. A transmisison system for reducing the bandwidth required for transmitting signals having intervals wherein the change in signal characteristics is substantially minimal comprising means to generate in sequence first digital signals representing the characteristics of said signals, means to measure the interval between a change in said first digital signals and to provide an associated second digital signal representative of said interval, means to store each first digital signal once with its associated second digital signal, means to transmit said stored first digital signals and associated second digital signals, means to receive said transmission including means to store said received first digital signals and associated second digital signals, means responsive to the application of first digital signals to reproduce said signals, means responsive to said associated second digital signals to establish the corresponding intervals measured thereby, and means to apply said first digital signals from said received storage means to said means to reproduce said signals for the corresponding intervals established responsive to the associated second digital signals.

3. A transmission system for reducing the bandwidth required for transmitting signals having intervals wherein the change in signal characteristics is substantially minimal comprising means to generate in sequence first number-representative signals representative of the characteristics of said signals, each said first number-representative signals comprising a plurality of binary signals each of which is associated with a digit position in a number, a means for each digit position to detect a change from one binary signal to another, means for each digit position responsive to said means to detect to provide a second number-representative signal representative of the interval between changes means to store each binary number signal with an associated second number-representative signal and means to transmit the contents of said means to store.

4. A transmission system as recited in claim 3 wherein said means for each digit position responsive to said means to detect to provide a second number-representative signal representative of the interval between changes includes a counter, means for advancing said counter at a rate equal to the rate of generating said first number-representative signals, whereby the count indication of said counter at the time of detection of a change from one binary signal to another is a second number-representative signal representative of the interval of said one binary signal.

5. A transmission system as recited in claim 4 wherein there is included means to enter into said means to store the count indication of said counter at the time said counter fills as well as the binary number signals of said first number representative signal at that time.

6. In a system for reducing bandwith wherein signals are transmitted represented by first number-representative signals, each of which comprises a plurality of binary signals and second number-representative signals associated with each binary first number-representative signals indicative of the interval over which a binary signal in said first number-representative signals is unchanged, a receiver for said signals comprising means to receive said first and second number-representative signals, means to store each said binary signal of a first number-representative signal and its associated second number, means to reproduce said signals responsive to the application of first number-representative signals, means to successively establish intervals represented by said stored second number-representative signals, and means to apply to said means to reproduce over said intervals the binary signals of a first number-representative signal with which said second numbers are associated.

7. In a system for reducing bandwidth as recited in claim 6 wherein said means to successively establish intervals represented by said stored second number-representative signals includes a counter providing an output representative of its count condition, means to advance the count condition of said counter at a desired range, means for comparing number representative signals and producing an output indicative of equality, means to successively read out from said means to store said second number-representative signals in response to successive outputs from said means for comparing signals, and means to apply output from said counter and said read out second number-representative signals to said means for comparing signals to be compared whereby successive outputs from said means for comparing signals occur at the end of intervals represented by said stored second number-representative signals.

8. A system for reducing the data required for video signal storage comprising means to generate in a timed sequence a plurality of coexistent binary electrical signals representative of amplitude levels of said video signal, for each coexistent binary electrical signal a counter providing an output representative of its count condition, means to advance the count condition of said counter at the same rate as the timing sequence of said means to generate, a storage means, and means to write into said storage means a binary signal and associated therewith the output of said counter at the time said binary signal changes from one binary form to another.

9. Apparatus as recited in claim 8 wherein said storage means is photographic film, said means to write into said storage means a binary signal and the output of said counter includes a plurality of cathode-ray tubes, means for coupling said cathode-ray tubes to said counter and to said means to generate binary signals to provide a visual representation of the output of said counter, means to focus said visual representation on said film, means to maintain said cathode-ray tubes blanked off, and means to render said blank-off means inoperative when said binary signal changes from one binary form to another for a time required to complete an exposure on said film.

10. A video signal recording and reproduction system comprising a system for reducing the data required for video signal storage, means to generate in a timed sequence a plurality of coexistent binary electrical signals representative of amplitude levels of said video signal, for each coexistent binary electrical signal a counter providing an output representative of its count condition, means to advance the count condition of said counter at the same rate as the timing sequence of said means to generate, a storage means, means to write into said storage means a binary signal and associated therewith the output of said counter at the time said binary signal changes from one binary form to another, a second counter providing an output representative of its count condition, means to advance the count condition of said second counter at a desired rate, means for comparing two counter outputs and providing an output indicative of equality, means to successively read from said storage means each binary signal and the associated counter output responsive to successive outputs from said means for comparing, means to apply to said means for comparing the counter output read from said storage means and said second counter output, means to reproduce video signals from applied binary electrical signals, and means to apply to said means to reproduce video signals the binary signals successively read from said storage means.

11. A system as recited in claim 10 wherein said storage means is photographic film and each said binary signal and its associated counter output is stored in said storage means by said means to write as the presence or absence of dots; said means to successively read from said storage means each binary signal and the associated counter output responsive to successive outputs from said means for comparing includes cathode-ray tube apparatus positioned on one side of said film to illuminate said film, photocell apparatus positioned on the other side of said film to detect the illumination passing through said film, and means responsive to said means for comparing to deflect the illumination provided by said cathode-ray tube apparatus to successively illuminate dots representative of said binary signals and associated counter output.

References Cited in the file of this patent

UNITED STATES PATENTS

| | | |
|---|---|---|
| 2,321,611 | Moynihan | June 15, 1943 |
| 2,732,424 | Oliver | Jan. 24, 1956 |
| 2,824,904 | Toulon | Feb. 25, 1958 |